(12) United States Patent
Lyu et al.

(10) Patent No.: US 12,501,492 B2
(45) Date of Patent: Dec. 16, 2025

(54) METHOD AND DEVICE FOR WIRELESS COMMUNICATION

(71) Applicant: QUECTEL WIRELESS SOLUTIONS CO., LTD., Shanghai (CN)

(72) Inventors: Ling Lyu, Shanghai (CN); Zheng Zhao, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 18/771,995

(22) Filed: Jul. 12, 2024

(65) Prior Publication Data

US 2024/0373472 A1    Nov. 7, 2024

Related U.S. Application Data

(63) Continuation of application No. PCT/CN2023/087040, filed on Apr. 7, 2023.

(51) Int. Cl.
  *H04W 74/0833* (2024.01)
  *H04L 5/00* (2006.01)

(52) U.S. Cl.
  CPC ....... *H04W 74/0833* (2013.01); *H04L 5/0012* (2013.01)

(58) Field of Classification Search
  CPC .................. H04W 74/0833; H04L 5/0012
  See application file for complete search history.

(56) References Cited

U.S. PATENT DOCUMENTS

| | | | | |
|---|---|---|---|---|
| 2021/0127429 A1* | 4/2021 | Huang | ............... | H04W 74/0833 |
| 2022/0272760 A1* | 8/2022 | Murray | ............. | H04W 74/0836 |
| 2022/0369375 A1* | 11/2022 | Lin | ................... | H04W 74/0833 |
| 2023/0085104 A1* | 3/2023 | Park | ......................... | H04L 1/18 370/329 |
| 2023/0300890 A1* | 9/2023 | Li | ......................... | H04W 64/00 370/329 |

(Continued)

FOREIGN PATENT DOCUMENTS

| CN | 109600211 | 4/2019 |
|---|---|---|
| CN | 110445590 | 11/2019 |

(Continued)

OTHER PUBLICATIONS

3GPP TS 38.215 V17.3.0, "3rd Generation Partnership Project; Technical Specification Group Radio Access Network; NR; Physical layer measurements (Release 17)," Mar. 2023, 26 pages.

3GPP TS 38.331 V17.4.0, "3rd Generation Partnership Project; Technical Specification Group Radio Access Network; NR; Radio Resource Control (RRC) protocol specification (Release 17)," Mar. 2023, 1323 pages.

(Continued)

*Primary Examiner* — Chuong M Nguyen
(74) *Attorney, Agent, or Firm* — Fish & Richardson P.C.

(57) ABSTRACT

A method and device for wireless communication are provided. One example method includes: transmitting a plurality of preambles in a first random access occasion group, the first random access occasion group comprising a plurality of random access occasions; wherein two random access occasions in the first random access occasion group are consecutive in time domain and separated by a first frequency hopping distance in frequency domain, and the first frequency hopping distance is related to a quantity of the plurality of random access occasions comprised in the first random access occasion group.

20 Claims, 3 Drawing Sheets

(56) References Cited

U.S. PATENT DOCUMENTS

2023/0413336 A1* 12/2023 Xiong ............... H04W 74/0833
2024/0048427 A1*  2/2024 Zhang ................. H04L 5/0044

FOREIGN PATENT DOCUMENTS

| CN | 112788762 | | 5/2021 | | |
| CN | 114080048 | | 2/2022 | | |
| CN | 114080048 A | * | 2/2022 | ............. | H04B 1/713 |
| WO | WO 2022006851 | | 1/2022 | | |
| WO | WO 2022028359 | | 2/2022 | | |
| WO | WO 2022206346 | | 10/2022 | | |
| WO | WO 2022226433 | | 10/2022 | | |
| WO | WO 2023051324 | | 4/2023 | | |
| WO | WO-2023184442 A1 | * | 10/2023 | | |

OTHER PUBLICATIONS

Huang et al., "Detection of random access preamble sequences in ultra high speed mobile environment," Systems Engineering and Electronics, vol. 40, No. 9, Sep. 2018, 6 pages (with English abstract).

International Search Report and Written Opinion in International Appln. No. PCT/CN2023/087040, mailed on Nov. 22, 2023, 12 pages (with English machines translation).

Nokia et al., "Approaches and solutions for Type A PUSCH repetitions for Msg3," 3GPP TSG RAN WG1 #106-bis-e, R1-2109890, e-Meeting, Oct. 11-19, 2021, 13 pages.

Notice of Allowance in Chinese Appln. No. 202380009860.9, mailed on May 15, 2024, 6 pages (with English translation).

Office Action in Chinese Appln. No. 202380009860.9, mailed on Mar. 27, 2024, 9 pages (with English translation).

* cited by examiner

METHOD AND DEVICE FOR WIRELESS COMMUNICATION

CROSS-REFERENCE TO RELATED APPLICATIONS

This application is a continuation of International Application No. PCT/CN2023/087040, filed on Apr. 7, 2023, the disclosure of which is hereby incorporated by reference in its entirety.

TECHNICAL FIELD

The various embodiments described in this document relate in general to the technical field of communication, and more specifically to a method and device for wireless communication.

BACKGROUND

At present, some applicants have proposed that under certain channel conditions (such as, scattering-rich environment), frequency hopping schemes can bring additional frequency domain diversity gain for communication based on random access channel occasion group (RO group, ROG). However, in the frequency hopping scheme, two random access channel (RACH) occasions (ROs) that are consecutive in the time domain are separated by only one resource block (RB) in the frequency domain. In other words, a frequency hopping distance between the two consecutive ROs in the time domain is one RB. The frequency domain diversity gain brought by this frequency hopping scheme based on a fixed frequency hopping distance is very limited.

SUMMARY

Embodiments of the present disclosure provide a method and device for wireless communication. Various aspects of the present disclosure are described below.

According to a first aspect, embodiments of the disclosure provide a method for wireless communication, including: transmitting a plurality of preambles in a first random access occasion group, the first random access occasion group including a plurality of random access occasions. Two random access occasions in the first random access occasion group are consecutive in time domain and separated by a first frequency hopping distance in frequency domain, and the first frequency hopping distance is related to a quantity of a plurality of random access occasions included in the first random access occasion group.

According to a second aspect, a method for wireless communication is provided. The method includes receiving one or more of a plurality of preambles in a first random access occasion group, the first random access occasion group including a plurality of random access occasions. Two random access occasions in the first random access occasion group are consecutive in time domain and separated by a first frequency hopping distance in frequency domain, and the first frequency hopping distance is related to a quantity of the plurality of random access occasions included in the first random access occasion group.

According to a third aspect, a first node for wireless communication is provided. The first node includes a first transmitter configured to transmit a plurality of preambles in a first random access occasion group, the first random access occasion group including a plurality of random access occasions. Two random access occasions in the first random access occasion group are consecutive in time domain and separated by a first frequency hopping distance in frequency domain, and the first frequency hopping distance is related to a quantity of the plurality of random access occasions included in the first random access occasion group.

According to a fourth aspect, a second node for wireless communication is provided. The second node includes: a first receiver configured to receive one or more of a plurality of preambles in a first random access occasion group, the first random access occasion group including a plurality of random access occasions. Two random access occasions in the first random access occasion group are consecutive in time domain and separated by a first frequency hopping distance in frequency domain, and the first frequency hopping distance is related to a quantity of the plurality of random access occasions included in the first random access occasion group.

According to a fifth aspect, an user device is provided and includes a processor, a memory, and a communication interface, where the memory is configured to store one or more computer programs and the processor is configured to invoke the computer programs in the memory to enable the user device to perform the method as described in the various aspects.

According to a sixth aspect, a network device is provided and includes a processor, a memory, and a communication interface, where the memory is configured to store one or more computer programs and the processor is configured to invoke the computer programs in the memory to enable the network device to perform the method as described in the various aspects.

According to a seventh aspect, a communication system is provided. The communication system includes the user device and/or the network device as described above. In another possible design, the system may further include other devices that interact with the user device or network device in the solutions provided by embodiments of the present disclosure.

According to an eight aspect, a computer-readable storage medium is provided and stores a computer program, the computer program causing a communication device (such as, an user device or a network device) to perform all or some operations of the method of any aspect described above.

According to a ninth aspect, a computer program product is provided. The computer program product includes a non-transitory computer-readable storage medium storing a computer program, the computer program being operable to cause a communication device (such as, an user device or a network device) to perform some or all of the operations in the method of the various aspects described above. In some implementations, the computer program product may be a software installation package.

According to a tenth aspect, a chip is provided and includes a memory and a processor, the processor being capable of invoking and running a computer program stored in the memory to carry out some or all of the operations described in the methods of the above aspects.

In embodiments of the disclosure, two random access occasions in the first random access occasion group are consecutive in time domain and separated by the first frequency hopping distance in the frequency domain, and the first frequency hopping distance is related to the quantity of the plurality of random access occasions included in the first random access occasion group. That is to say, a frequency hopping distance (e.g., the first frequency hopping distance) between the two random access occasions in the first random access occasion group can vary with the quantity of PRACH transmissions in the first random access occasion group. Compared with a conventional frequency hopping scheme in which a frequency domain span of the random access occasion group is limited, which is caused by that the frequency hopping distance between the two random access occasions in the random access occasion group is fixed, the embodiments of the disclosure is helpful to improving the frequency domain span corresponding to the first random access occasion group and improving the frequency domain diversity gain brought by the frequency hopping scheme.

In addition, in embodiments of the present application, the random access occasion groups corresponding to different numbers of random access occasions have a large difference in the first hopping frequency distance, which helps to reduce the probability of a conflict of the preambles transmitted on a plurality of different ROs by allowing some or all of the random access occasions in the different random access occasion groups to be separated. In particular, in the case of different users selecting the preambles randomly, even though the preambles selected by the different users may conflict on a particular RO, the preambles may have a smaller probability of conflict on a plurality of different ROs. Therefore, the frequency hopping scheme of the embodiments of the present disclosure helps to improve the coverage performance of multiple PRACH transmissions, and reduce the probability of conflict on the physical random access channel (PRACH), thereby reducing the random access delay and improving the efficiency of resource utilization.

Furthermore, in embodiments of the present disclosure, the first frequency hopping distance is related to the quantity of the plurality of random access occasions included in the first random access occasion group, which helps to improve the span in frequency domain of the random access occasion group that includes fewer quantity of random access occasions, as compared to the conventional frequency hopping scheme in which the frequency hopping distance between the two random access occasions in the random access occasion group is fixed, and to increase frequency domain diversity gain due to use of the frequency hopping scheme.

DETAILED DESCRIPTION OF THE EMBODIMENTS

A clear and complete description of the technical solutions of the embodiments of the present disclosure will be given below in conjunction with the accompanying drawings in the embodiments of the present disclosure, and it will be apparent that the described embodiments are merely some of the embodiments of the present disclosure, rather than all embodiments.

Communication System Architecture

Figure 1:
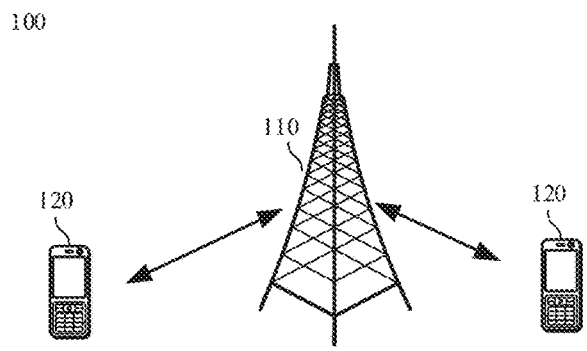
FIG. 1 illustrates a wireless communication system 100 according to embodiments of the present disclosure.

FIG. 1 is an example diagram of a system architecture of a wireless communication system 100 to which embodiments of the present disclosure may be applied. The wireless communication system 100 may include a network device 110 and at least one user equipment (UE) 120. The network device 110 may communicate with each UE 120. The network device 110 may provide communication coverage for a particular geographic region and may communicate with the at least one UE 120 located within the coverage region.

FIG. 1 exemplarily illustrates one network device and two UEs. Alternatively, the wireless communication system 100 may include a plurality of network devices and other numbers of UEs may be included within a coverage range of each network device, which is not limited in embodiments of the present disclosure.

Alternatively, the wireless communication system 100 may further include other network entities such as network controllers, mobility management entities, and the like which are not limited in embodiments of the present disclosure.

It shall be understood that the technical proposal of the embodiments of the present disclosure may be applied to random access, or the technical proposal of the embodiments of the present disclosure can also be applied to beam failure recovery. Further, the technical proposal of the embodiments of the present disclosure may be applied to Type-1 random access procedure, or can also be applied to Type-2 random access procedure. Further, the technical proposal of the embodiments of the present disclosure can be applied to Uu interface, or can also be applied to the PC5 interface. Further, the technical proposal of the embodiments of the present disclosure can be applied to single carrier communication, or can also be applied to multi-carrier communication. Further, the technical proposal of the embodiments of the present disclosure can be applied to multi-antenna communication, or can also be applied to single-antenna communication. Further, the technical proposal of the embodiments of the present disclosure can be applied in a scenario involving UEs and a base station, or can be applied in a V2X scenario, the communication scenario involving UEs and relays, or the communication scenario involving the relays and the base stations, so as to obtain similar technical effects in the scenario involving the UEs and the base station. Further, the technical proposal of the embodiments of the present disclosure can be applied to various communication scenarios, such as enhanced mobile broadband (eMBB) scenarios, ultra-reliable low-latency communication (URLLC) scenarios, massive machine type communication (mMTC) scenarios, and the like. In addition, adopting a unified solution for different scenarios also helps to reduce hardware complexity and cost.

It shall be understood that the embodiments and features in the embodiments of the first node of the present disclosure may be applied to the second node and vice versa without conflict. Embodiments of the present disclosure and features in the embodiments may be arbitrarily combined with each other without conflict.

It shall be understood that the technical solutions of the embodiments of the present disclosure may be applied to various communication systems, such as: $5^{th}$ generation (5G) mobile communication systems or new radio (NR), long term evolution (LTE) systems, LTE frequency division duplex (FDD) systems, LTE time division duplex (TDD), and the like. The technical proposal provided by the present disclosure can also be applied to future communication systems, such as sixth generation mobile communication systems, satellite communication systems, etc.

The UE in embodiments of the present disclosure may also be referred to as a user device, an access terminal, a subscriber unit, a subscriber station, a mobile, a mobile station (MS), a mobile terminal (MT), a remote station, a remote terminal, a mobile device, a user terminal, a terminal, a wireless communication device, a user agent, or a user device. The UE in the embodiments of the present disclosure may be a device providing voice and/or data connectivity to a user, and may be used for connecting people, objects, and machines, such as handheld devices with wireless connection function, vehicle-mounted devices, etc. The UE in the embodiments of the present disclosure may be a mobile phone, a tablet computer (Pad), a notebook computer, a palmtop computer, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in smart grid, a wireless terminal in transportation safety, and a wireless terminal in a smart city, a wireless terminal in smart home, etc. Alternatively, the UE may be used to act as a base station. For example, the UE may act as a scheduling entity that provides side link signals between UEs in V2X or D2D or the like. For example, cellular phones and cars communicate with each other using side link signals. Cellular phones communicate with smart homes devices without relaying communication signals through base stations.

The network device in embodiments of the present disclosure may be a device for communicating with the UE, and the network device may also be referred to as an access network device or a radio access network device. For example, the network device may be a base station. The network device in the embodiments of the present disclosure may refer to a radio access network (RAN) node (or device) that accesses a UE to a wireless network. The base station can broadly cover or replace with the following names, such as Node B (NodeB), evolved NodeB (eNB), next generation NodeB (gNB), relay station, access point, transmitting and receiving point (TRP), transmitting point (TP), master eNodeB (MeNB), secondary eNodeB (SeNB), multi-standard radio (MSR) node, home base station, network controller, access node, wireless node, access point (AP), transmission node, transceiver node, base band unit (BBU), remote radio unit (RRU), an active antenna unit (AAU), a remote radio head (RRH), a central unit (CU), a distributed unit (DU), a positioning node, and the like. The base station may be a macro base station, a micro base station, a relay node, a donor node or the like, or a combination thereof. The base station may also refer to a communication module, a modem, or a chip provided in the device or device. The base station may also be a mobile switching center and a device that undertakes a base station function in device-to-device (D2D), vehicle-to-everything (V2X), machine-to-machine (M2M) communication, a network-side device in a 6G network, a device that undertakes a base station function in a future communication system, and the like. Base stations can support networks with the same or different access technologies. There is no restriction on the specific technology and the specific equipment adopted by the network in the embodiments of the present disclosure.

The base station can be fixed or mobile. For example, a helicopter or unmanned aerial vehicle may be configured to act as a mobile base station and one or more cells may change depending on the location of the mobile base station. In other examples, the helicopter or unmanned aerial vehicle may be configured to serve as a device for communicating with another base station.

In some deployments, the network device in the embodiments of the present disclosure may refer to a CU or a DU or the network device includes a CU and a DU. The gNB may further include AAU.

The network device and the UE can be deployed on land, including indoor or outdoor, hand-held, or vehicle-mounted, or can also be deployed on the water surface. Alternatively, the network device and the UE can also be deployed on airplanes, balloons, and satellites in the air. In the embodiments of the present disclosure, the scene in which the network device and the UE are located is not limited.

It shall be understood that all or part of the functionality of the communication device in the present disclosure may also be implemented by software functionality running on hardware or by virtualization functionality instantiated on a platform (e.g. a cloud platform).

It shall be understood that the terminology in embodiments of the present disclosure may be interpreted with reference to the 3GPP specification protocols TS36 series, TS37 series, and TS38 series, and can also be interpreted with reference to the specification protocols of the institute of electrical and electronics engineers (IEEE).

Coverage Enhancement of PRACH Transmission

Coverage performance of communication systems (for example, NR system) is an important factor that operators need to consider when the operators deploy commercial communication networks, because the coverage performance of the communication systems may directly affect the service quality of the communication system and the cost of operators, such as capital expenditure (CAPEX) and operating expense (OPEX) of the operators.

The coverage performance of the communication systems may vary with different operating frequency bands of the communication systems. For example, compared to LTE systems, NR systems operate in higher frequency bands (e.g., millimeter-wave bands), resulting in greater path loss in the NR systems, which leads to relatively poorer coverage performance in the NR systems. Therefore, as the frequency bands supported by the communication systems may be more and more high, how to enhance the coverage of the communication systems has become a problem to be solved.

In most scenarios actually deployed, because the capability of the UE is weaker than that of the network device, the coverage performance of uplink (UL) is the bottleneck of coverage enhancement of the communication system. With the development of communication technologies, uplink services in some emerging vertical use cases are gradually increasing, for example, video uploading services. In the scenario involving more uplink services, how to the coverage performance of UL is a problem that needs to be further solved.

In related technologies, there are technical schemes on coverage enhancement for some uplinks. For example, in release 17 (Rel-17) of the NR, coverage enhancement schemes for physical uplink shared channel (PUSCH), physical uplink control channel (PUCCH), and message 3 (Msg3) in the random access procedure has been designed.

However, in the Rel-17, there is no design scheme for coverage enhancement of the PRACH, but the transmission performance of the PRACH is very important for many processes, such as, initial access and beam failure recovery, so it is also relatively important to enhance the coverage of the PRACH. Based on this, the work item (WI) for "further NR coverage enhancements" has been formally established in Rel-18, where enhancing the coverage performance of the PRACH transmission is one of important topics of the work item.

As a possible implementation, multiple PRACH transmissions can be used to realize the coverage enhancement of the PRACH transmissions. That is, the coverage enhancement of PRACH transmissions can be achieved by repeated transmissions on the PRACH (for example, sending preambles on the PRACH multiple times).

In the embodiments of the present disclosure, the multiple PRACH transmissions may refer to multiple PRACH transmissions using same beams, or may refer to multiple PRACH transmissions using different beams. Taking multiple PRACH transmissions using the same beams as an example, the 3rd generation partnership project (3GPP) radio access network (RAN) 1 #110bis-e conference has reached an agreement that PRACH occasions (or RACH occasions) at least at different time instances can be used for multiple PRACH transmissions using the same beams. In addition, the RANI #110bis-e conference further defines a repetition factor (a quantity of multiple PRACH transmissions/number of times of multiple PRACH transmissions) of the multiple PRACH transmissions using the same beams, and the repetition factor can include at least 2 and 4, and may include 8 later.

Association Between Synchronization Signal Blocks and PRACH Occasions

The synchronization signal block is a signal structure defined in communication standard, which can include primary synchronization signal (PSS), secondary synchronization signal (SSS), and physical broadcast channel (PBCH). In some embodiments, the synchronization signal block may be denoted as SSB. In some embodiments, the synchronization signal block may also be denoted as SS/PBCH block (synchronization signal/physical broadcast channel block), i.e., the synchronization signal block may also be referred to as a synchronization signal broadcast channel block, which is not limited in embodiments of the present disclosure. The synchronization signal block is represented as SSB in following embodiments. It shall be understood that SSB in the following text can be replaced by SS/PBCH block.

The SSB is a set of resources transmitted over a basic orthogonal frequency division multiplexing grid, and the set of resources may include, for example, one or more of following resources: time domain resources, frequency domain resources, code domain resources, and the like.

When the UE detects the SSB sent from the network device in the process of initial access or beam failure recovery by the UE, the UE can obtain an SSB index of the SSB, to determine a position of the SSB in the time domain, so as to realize downlink synchronization with the network device. In order to realize uplink synchronization, the UE needs to send preambles to the network device. How the UE selects the preambles to be sent and at which PRACH occasion the selected preamble should be sent are determined by the UE based on the received (or detected) SSB.

As a feasible technical proposal, each SSB is associated with at least one preamble of each of at least one PRACH occasion, so that when the UE performs initial access or beam failure recovery, the UE can determine an associated PRACH occasion and preamble according to the received SSB, so as to continue to perform the PRACH transmission.

In the related technologies, the SSB indexes are mapped to the PRACH occasions and preambles in the following order: firstly, in an increasing order of preamble indexes within a single PRACH occasion; secondly, in an increasing order of frequency resource indexes for frequency multiplexed PRACH occasions; thirdly, in an increasing order of time resource indexes for time multiplexed PRACH occasions within a PRACH slot; and finally, in an increasing order of indexes for PRACH slots.

Random Access Channel Occasion Group

In some scenarios, an RO group is introduced to indicate a set containing multiple random access channel (RACH) occasions (ROs), and thus, the RO group is also referred to as "RO set". Embodiments of the present disclosure are not limited to the name of the RO group. For ease of description, embodiments of the present disclosure are described based on the RO group.

As an embodiment, the RO group (ROG) may include ROs corresponding to multiple PRACH transmissions using the same beams.

As an embodiment, it is also discussed in some conferences (e.g., 3GPP RAN 1 #110bis-e) that ROs in different time periods (also referred to as time instances) may be used for multiple PRACH transmissions using the same beams.

As an embodiment, for a particular quantity of PRACH transmissions, an ROG includes valid ROs, which helps to transmit the particular quantity of PRACHs in the valid ROs.

As an embodiment, all ROs in one ROG may be associated with a synchronization signal/physical broadcast channel block. It shall be understood that, in embodiments of the present disclosure, one ROG may be associated with multiple SSBs.

At present, some applicants have proposed that under certain channel conditions (such as, scattering-rich environment), frequency hopping schemes can bring additional frequency domain diversity gain for multiple PRACH transmissions using the same beams. Specifically, for the frequency hopping scheme involving the two PRACH transmissions, an RO index pattern used in the frequency domain is {0, 1}. An RO index pattern used in the frequency domain is {0, 1, 0, 1} for the frequency hopping scheme involving four PRACH transmissions.

On one hand, based on the conventional frequency hopping scheme described above, it can be seen that two random access channel (RACH) occasions (ROs) that are consecutive in the time domain are separated by only one resource block (RB) in the frequency domain, or a frequency hopping distance between two consecutive ROs in the time domain is one RB. The frequency domain diversity gain brought by this frequency hopping scheme based on a fixed frequency hopping distance is very limited.

For example, under the channel condition with insufficient scattering, the channel fading in frequency domain is flat. In the frequency hopping scheme with one RB as the frequency hopping distance, channel conditions corresponding to consecutive ROs in the time domain may not differ much, resulting in very limited frequency domain diversity gain brought by the frequency hopping scheme.

On the other hand, based on the conventional frequency hopping scheme described above, it can be seen that for the frequency hopping scheme involving the two PRACH transmissions, the frequency hopping distance between consecutive ROs in the time domain is still one RB, which leads to a small frequency domain diversity gain for a small quantity of multiple PRACH transmissions.

Furthermore, based on the conventional frequency hopping scheme described above, it can be seen that at present, the performance of the multiple PRACH transmissions is poor, which leads to the PRACH transmission becoming the bottleneck of the coverage of the communication system (for example, NR system).

Therefore, in view of the above problems, embodiments of the present disclosure provide a scheme for wireless communication. For case of understanding, a method for wireless communication according to embodiments of the present disclosure is described below in Embodiment 1 in conjunction with FIG. 2.

Embodiment 1

Figure 2:
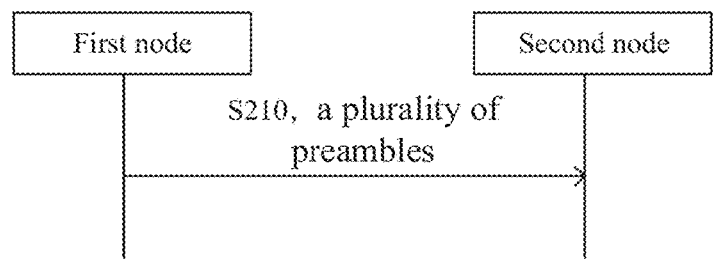
FIG. 2 illustrates a method for wireless communication according to embodiments of that present disclosure.

The method shown in FIG. 2 includes an operation at S210. It shall be understood that the method shown in FIG. 2 may be performed by a first node. There is no restriction on the type of the first node. In some implementations, the first node may be a network device, where the network device may include, for example, a network-controlled repeater (NCR), an access network device, or the like.

At S210, a plurality of preambles are transmitted in a first random access occasion group, the first random access occasion group including a plurality of random access occasions.

As an embodiment, the quantity of the plurality of random access occasions included in the first random access occasion group may be one of 2, 4, and 8. It shall be understood that, in the embodiments of the present disclosure, the first random access occasion group may include other quantities of random access occasions, which are not limited in the embodiment of the present disclosure.

As an embodiment, the plurality of preambles described above may be transmitted from the first node to a second node, where the second node may be a user equipment. In other implementations, the second node may be a user equipment other than the first node.

As an embodiment, two random access occasions in the first random access occasion group are consecutive in time domain and separated in frequency domain by a first frequency hopping distance, where the first frequency hopping distance is related to the quantity of the plurality of random access occasions included in the first random access occasion group.

The above-mentioned first frequency hopping distance can be understood as a frequency distance separated between two random access occasions in a frequency hopping communication system. In some scenarios, the above-mentioned frequency hopping distance can also be called "frequency hopping interval". For convenience of description, the first frequency hopping distance is introduced as an example below. In embodiments of the present disclosure, there is no restriction on a frequency domain unit (unit in the frequence domain) of the frequency hopping distance. For example, the frequency domain unit of the frequency hopping distance is RB. For another example, the frequency domain unit of the frequency hopping distance is RE.

It is to be noted that, in the embodiments of the present disclosure, the quantity of the plurality of random access occasions included in the first random access occasion group may include or be replaced by at least one of the following: a quantity of the plurality of preambles transmitted in the first random access occasion group, and the quantity of PRACH transmissions of multiple PRACH transmissions based on the first random access occasion group.

Additionally, in embodiments of the present disclosure, the random access occasion may include or be replaced by at least one of: a physical random access channel occasion (PRACH occasion), and a physical random access channel transmission occasion (PRACH transmission occasion).

As an embodiment, any two random access occasions in the first random access occasion group that are consecutive in the time domain are separated in the frequency domain by the first frequency hopping distance. That is, time-frequency relationships between all random access occasions in the first random access occasion group can satisfy the above conditions. In addition, in the embodiments of the present disclosure, the two random access occasions in the first random access occasion group may mean specific two random access occasions in the first random access occasion group that are consecutive in the time domain and are separated by the first frequency hopping distance in the frequency domain. That is, the time-frequency relationships between merely some two random access occasions in the first random access occasion group can satisfy the above conditions.

It is to be noted that if merely some random access occasions in the first random access occasion group satisfy the above conditions, a frequency hopping distance between random access occasions in the first random access occasion group other than the some random access occasions may be one or more second frequency hopping distances. The one or more second frequency hopping distances may be different from the first frequency hopping distance. In addition, there is no restriction on the manner in which the second frequency hopping distance is determined in embodiments of the present disclosure. For example, the second frequency hopping distance may be predefined or pre-configured.

As one embodiment, the quantity of the random access occasions included in the first random access occasion group is configured to determine the first frequency hopping distance, or the first frequency hopping distance is determined based on the quantity of random access occasions in the first random access occasion group. The relationship between the first frequency hopping distance and the quantity of random access occasions in the first random access occasion group will be described below in connection with Embodiment 2 and will not be repeated herein for the sake of brevity.

It is to be noted that in the embodiments of the present disclosure, the first frequency hopping distance can be determined only based on the quantity of random access occasions in the first random access occasion group. Alternatively, in embodiments of the present disclosure, the first frequency hopping distance may also be determined based on the quantity of random access occasions in the first random access occasion group and other factors, where the other factors may include, for example, transmission power, terrain, communication environment, etc.

As one embodiment, the random access occasions included in the first random access occasion group are configured to transmit the plurality of preambles, respectively. For example, each random access occasion of the random access occasions may be used to transmit one preamble of the plurality of preambles. As another example, each random access occasion of the random access occasions may be used to transmit at least two preambles of the plurality of preambles. A relationship between the random access occasions and preambles in embodiments of the present disclosure will be described below in conjunction with FIGS. 3 to 4 and will not be repeated here for the sake of brevity.

As one embodiment, any one random access occasion of the random access occasions included in the first random access occasion group belongs to a PRACH slot in the time domain. It shall be understood that in the embodiments of the present disclosure, a certain random access occasion of the random access occasions included in the first random access occasion group belongs to a PRACH slot in the time domain, which is not limited in the embodiment of the present disclosure.

As one embodiment, all the random access occasions included in the first random access occasion group belong to a PRACH slot in the time domain. It shall be understood that, in the embodiment of the present disclosure, some of the random access occasions included in the first random access occasion group belong to a PRACH slot in the time domain, which is not limited in the embodiment of the present disclosure.

The locations of the random access occasions included in the first random access occasion group in the time domain are described above, and a time-domain granularity and/or frequency-domain granularity occupied by one random access occasion in the first random access occasion group in embodiments of the present disclosure are described below.

As one embodiment, any one random access occasion of the random access occasions included in the first random access occasion group includes at least one multicarrier symbol in the time domain, and/or the any one random access occasion includes at least one resource block (RB) in the frequency domain. In other embodiments, a certain random access occasion of the random access occasions included in the first random access occasion group includes at least one multicarrier symbol in the time domain, and/or includes at least one RB in the frequency domain. It shall be understood that in embodiments of the present disclosure, there is no restriction on a size of a granularity of a time-frequency resource occupied by the random access occasion.

It is to be noted that, in embodiments of the present disclosure, the multicarrier symbol may include or be replaced by at least one of a multicarrier symbol, an orthogonal frequency division multiplexing (OFDM) symbol, a discrete Fourier transformation-spread-OFDM (DFT-s-OFDM) symbol, a single-carrier frequency division multiple access (SC-FDMA) symbol.

As one embodiment, the random access occasions included in the first random access occasion group belong to a plurality of PRACH slots. For example, each of the random access occasions included in the first random access occasion group belongs to a PRACH slot of the plurality of PRACH slots. As another example, some of the random access occasions included in the first random access occasion group belong to one of the plurality of PRACH slots.

As one embodiment, any one of the random access occasions included in the first random access occasion group occupies a plurality of multicarrier symbols in the time domain. It shall be understood that in the embodiment of the present disclosure, a certain random access occasion among the random access occasions included in the first random access occasion group occupies a plurality of multicarrier symbols in the time domain, where for the related introduction of the multicarrier symbols, reference may be made to the above embodiments.

As one embodiment, any one of the random access occasions included in the first random access occasion group occupies a plurality of uplink symbols in the time domain. It shall be understood that in the embodiment of the present disclosure, a certain random access occasion among the random access occasions included in the first random access occasion group occupies a plurality of uplink symbols in the time domain.

As one embodiment, any one of the random access occasions included in the first random access occasion group occupies an RB in the frequency domain. It shall be understood that in the embodiment of the present disclosure, a certain random access occasion among the random access occasions included in the first random access occasion group occupies an RB in the frequency domain, which is not limited in the embodiment of the present disclosure.

As one embodiment, any one of the random access occasions included in the first random access occasion group occupies a plurality of RBs in the frequency domain. It shall be understood that in the embodiment of the present disclosure, a certain random access occasion among the random access occasions included in the first random access occasion group occupies a plurality of RBs in the frequency domain, which is not limited in the embodiment of the present disclosure.

Embodiment 2

As one embodiment, the first frequency hopping distance is negatively correlated with the quantity of the random access occasions included in the first random access occasion group. That is, the first frequency hopping distance decreases as the quantity of the random access occasions included in the first random access occasion group increases, or the first frequency hopping distance increases as the quantity of the random access occasions included in the first random access occasion group decreases.

For example, the quantity of random access occasions included in random access occasion group 1 is N1, and the quantity of random access occasions included in random access occasion group 2 is N2, and N1<N2, a first frequency hopping distance corresponding to the random access occasion group 1 is larger than a first frequency hopping distance corresponding to the random access occasion group 2.

The relationship between the first frequency hopping distance and the quantity of random access occasions included in the first random access occasion group in the embodiment of the present disclosure is described above, and the following will describe a manner in which the first frequency hopping distance in the embodiment of the present disclosure is determined.

As one embodiment, the first frequency hopping distance is inversely proportional to the quantity of random access occasions included in the first random access occasion group.

Figure 3:
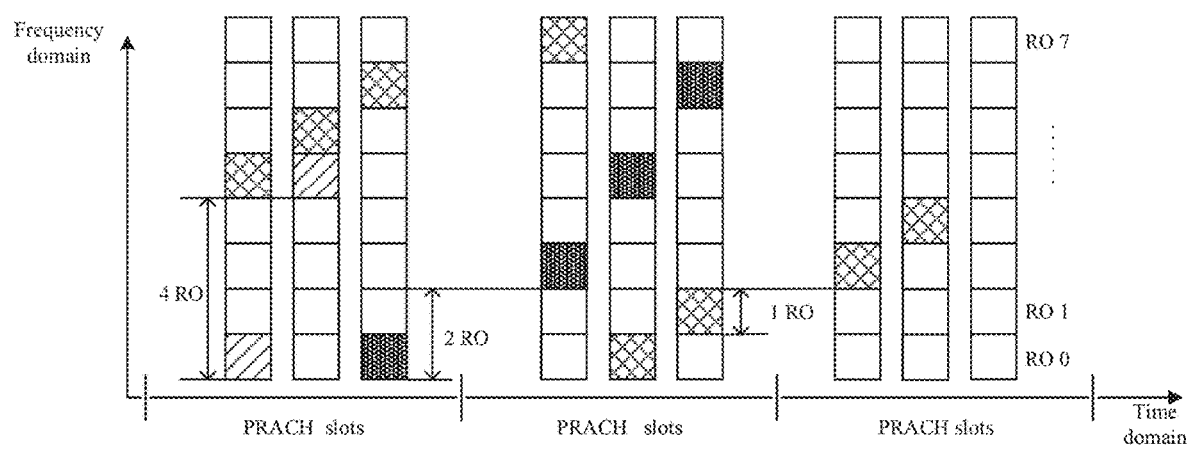
FIG. 3 is a schematic diagram of a relationship between random access occasions and preambles according to an embodiment of the present disclosure.

FIG. 3 shows a relationship between the quantity of random access occasions included in the random access occasion group and the first frequency hopping distance in an embodiment of the present disclosure. It is assumed that the quantity of random access occasions included in the random access occasion group is the quantity of PRACH transmissions in the random access occasion group, as shown in FIG. 3, if the quantity of PRACH transmissions in ROG1 is 2, that is, Rep1=2, the first frequency hopping distance Drog1 corresponding to ROG1 can be determined by formula: Drog1=(8/Rep1) RB=4 RB. If the quantity of PRACH transmissions in ROG2 is 4, that is, Rep2=4, the first frequency hopping distance Drog2 corresponding to ROG2 can be determined by formula: Drog2=(8/Rep2) RB=2RB. Alternatively, if the quantity of PRACH transmissions in ROG3 is 8, that is, Rep3=8, the first frequency hopping distance Drog3 corresponding to ROG3 can be determined by formula: Drog3=(8/Rep3) RB=1RB. It is clear that the first frequency hopping distance corresponding to ROG is inversely proportional to the quantity of PRACH transmissions in ROG.

As one embodiment, the first frequency hopping distance is equal to a modulo between a first value and the quantity of the random access occasions included in the first random access occasion group.

As one embodiment, a product of the first frequency hopping distance and the quantity of random access occasions included in the first random access occasion group is not greater than the first value. In other words, the product of the first frequency hopping distance and the quantity of random access occasions included in the first random access occasion group is less than or equal to the first value.

FIG. 3 shows a relationship between the quantity of random access occasions included in the random access occasion group and the first frequency hopping distance in an embodiment of the present disclosure. It is assumed that the quantity of random access occasions included in the random access occasion group is the quantity of PRACH transmissions in the random access occasion group, and the first value is 8, as shown in FIG. 3, if the quantity of PRACH transmissions in ROG1 is 2, that is, Rep1=2, the first frequency hopping distance Drog1 corresponding to ROG1 can be determined by formula: Drog1=(8/Rep1) RB=4 RB. If the quantity of PRACH transmissions in ROG2 is 4, that is, Rep2=4, the first frequency hopping distance Drog2 corresponding to ROG2 can be determined by formula: Drog2=(8/Rep2) RB=2RB. Alternatively, if the quantity of PRACH transmissions in ROG3 is 8, that is, Rep3=8, the first frequency hopping distance Drog3 corresponding to ROG3 can be determined by formula: Drog3=(8/Rep3) RB=1RB.

Therefore, for ROG1, the product of the first frequency hopping distance and the quantity of PRACH transmissions in ROG1 is equal to the first value. For ROG2, the product of the first frequency hopping distance and the quantity of PRACH transmissions in ROG2 is equal to the first value. For ROG3, the product of the first frequency hopping distance and the quantity of PRACH transmissions in ROG3 is equal to the first value.

It shall be understood that, in embodiments of the present disclosure, the first frequency hopping distance may be determined based on the quotient of the first value and the quantity of the random access occasions included in the first random access occasion group. Alternatively, the first frequency hopping distance may be determined based on the remainder of the first value and the quantity of the random access occasions included in the first random access occasion group, which is not specifically limited in the embodiments of the present disclosure.

It is to be noted that there is no restriction on the manner in which the first value is determined in the embodiment of the present disclosure. As an embodiment, the first value may be fixed. As one embodiment, the first value may be configured by high layer signaling. As one embodiment, the first value may be equal to the quantity of a plurality of random access occasions of frequency division multiplexing over a time period (e.g., time instance).

The relationship between the quantity of random access occasions included in the first random access occasion group and the first frequency hopping distance in the embodiment of the present disclosure is described above. In some scenarios, a plurality of random access occasions may be included in a time period (e.g., time instance), and the first frequency hopping distance corresponding to the time instance may be related to the quantity of random access occasions in the time instance. The following is described in connection with Embodiment 3.

Embodiment 3

As one embodiment, the method shown in FIG. 2 further includes receiving first information, the first information being configured to indicate the quantity of a plurality of random access occasions within a time instance, and the plurality of random access occasions within the time instance being frequency division multiplexed. The first frequency hopping distance is related to the quantity of the plurality of random access occasions within the time instance.

In the embodiment of the present disclosure, there is no restriction on the time instance. As an embodiment, the time instance may include a PRACH slot. As one embodiment, the time instance includes a multicarrier symbol. As one embodiment, the time instance includes a plurality of multicarrier symbols. For the introduction of carrier symbols, reference may be made to Embodiment 1.

As one embodiment, the first information may be sent by the second node. It shall be understood that in the embodiment of the present disclosure the above-mentioned first information may be sent by other nodes and the embodiment of the present disclosure is not limited to this.

As one embodiment, the first information may be configured to indicate the first value. It shall be understood that in the embodiment of the present disclosure, information indicating the first value may be different from the first information described above.

As one embodiment, the first frequency hopping distance is related to both the quantity of the random access occasions included in the first random access occasion group and the quantity of the plurality of random access occasions over the time instance.

As one embodiment, the quantity of the plurality of random access occasions within the time instance is configured to determine the first frequency hopping distance. Alternatively, the first frequency hopping distance may be determined based on the quantity of the plurality of random access occasions within the time instance.

It is to be noted that in the embodiments of the present disclosure, the first frequency hopping distance can be determined only based on the quantity of the plurality of random access occasions within the time instance. It shall be understood that, in embodiments of the present disclosure, the first frequency hopping distance may also be determined based on the quantity of the plurality of random access occasions within the time instance and other factors, where the other factors may include, for example, transmission power, terrain, communication environment, or the like.

As one embodiment, the above manner of determining the first frequency hopping distance may also be used in conjunction with the manner of determining the first frequency hopping distance described in Embodiment 2. That is, the quantity of the random access occasions included in the first random access occasion group and the quantity of the plurality of random access occasions within the time instance are configured to determine the first frequency hopping distance. It shall be understood that in the embodiment of the present disclosure, the above-described method for determining the first frequency hopping distance may be implemented separately from the method for determining the first frequency hopping distance described in Embodiment 2.

Hereinafter, a scheme for determining the first frequency hopping distance based merely on the quantity of random access occasion groups within the time instance and a scheme for determining the first frequency hopping distance based on the quantity of random access occasions within the time instance and the quantity of random access occasions included in the first random access occasion group are respectively described in connection with Implementation 1 and Implementation 2.

Implementation 1 describes a scheme for determining the first frequency hopping distance based on the quantity of random access occasions within the time instance.

As one embodiment, the first frequency hopping distance is negatively correlated with the quantity of the plurality of random access occasions within the time instance. That is, the first frequency hopping distance decreases as the quantity of random access occasions within the time instance increases, or the first frequency hopping distance increases as the quantity of random access occasions within the time instance decreases.

For example, the quantity of random access occasions included in time instance 1 is N3, the quantity of random access occasions included in time instance 2 is N4, and N3<N4, a first frequency hopping distance corresponding to time instance 1 is larger than a first frequency hopping distance corresponding to time instance 2.

The relationship between the first frequency hopping distance and the quantity of random access occasions within the time instance in the embodiment of the present disclosure is described above, and the first frequency hopping distance being determined in another embodiment of the present disclosure is described below.

As one embodiment, the first frequency hopping distance is inversely proportional to the quantity of the plurality of random access occasions within the time instance.

As one embodiment, the first frequency hopping distance is equal to a modulo between the first value and the quantity of the plurality of random access occasions within the time instance.

As one embodiment, the product of the first frequency hopping distance and the quantity of the plurality of random access occasions within the time instance is not greater than a first value. In other words, the product of the first frequency hopping distance and the quantity of the plurality of random access occasions within the time instance is less than or equal to the first value.

It shall be understood that in embodiments of the present disclosure, the first frequency hopping distance may be equal to the quotient between the first value and the quantity of the plurality of random access occasions within the time instance. Alternatively, the first frequency hopping distance may be equal to the remainder between the first value and the quantity of the plurality of random access occasions within the time instance, which is not specifically limited by the embodiment of the present disclosure.

It is to be noted that the method for determining the first value is not limited in the embodiment of the present disclosure. As an embodiment, the first value may be fixed. As one embodiment, the first value may be configured by high layer signaling. As one embodiment, the first value may be equal to the quantity of frequency division multiplexed random access occasions within the time instance.

Implementation 2 describes a scheme for determining the first frequency hopping distance based on the quantity of the plurality of random access occasions within the time instance and the quantity of the random access occasions included in the first random access occasion group.

As one embodiment, the first frequency hopping distance is equal to a modulo between the quantity of the plurality of random access occasions within the time instance and the quantity of the random access occasions included in the first random access occasion group.

As one embodiment, the product of the first frequency hopping distance and the quantity of the random access occasions included in the first random access occasion group is not greater than the quantity of the plurality of random access occasions within the time instance. Alternatively, the product of the first frequency hopping distance and the quantity of the plurality of random access occasions included in the first random access occasion group is less than or equal to the quantity of the plurality of random access occasions within the time instance.

FIG. 3 shows a relationship between the quantity of random access occasions included in the random access occasion group and the first frequency hopping distance in an embodiment of the present disclosure. It is assumed that the quantity of random access occasions included in the random access occasion group is the quantity of PRACH transmissions in the random access occasion group, and the quantity of the plurality of random access occasions within the time instance is 8, as shown in FIG. 3, if the quantity of PRACH transmissions in ROG1 is 2, that is, Rep1=2, the first frequency hopping distance Drog1 corresponding to ROG1 can be determined by formula: Drog1=(8/Rep1) RB=4 RB. If the quantity of PRACH transmissions in ROG2 is 4, that is, Rep2=4, the first frequency hopping distance Drog2 corresponding to ROG2 can be determined by formula: Drog2=(8/Rep2) RB=2RB. Alternatively, if the quantity of PRACH transmissions in ROG3 is 8, that is, Rep3=8, the first frequency hopping distance Drog3 corresponding to ROG3 can be determined by formula: Drog3=(8/Rep3) RB=1RB.

Therefore, for ROG1, the product of the first frequency hopping distance and the quantity of the PRACH transmissions in ROG1 is equal to the quantity of the plurality of random access occasions within the time instance. For ROG2, the product of the first frequency hopping distance and the quantity of the PRACH transmissions in ROG2 is equal to the quantity of the plurality of random access occasions within the time instance. For the ROG 3, the product of the first hopping distance and the quantity of the PRACH transmissions in the ROG3 is equal to the quantity of the plurality of random access occasions within the time instance.

It shall be understood that, in embodiments of the present disclosure, the first frequency hopping distance may be determined based on a quotient of the quantity of the random access occasions within the time instance and the quantity of the plurality of random access occasions included in the first random access occasion group. Alternatively, the first frequency hopping distance may be determined based on the remainder of the quantity of random access occasions within the time instance and the quantity of the plurality of random access occasions included in the first random access occasion group, which is not specifically limited in the embodiment of the present disclosure.

In the embodiment of the present disclosure, there is no restriction on the first information. As one embodiment, the first information may be a radio resource control (RRC) layer signaling, or the first information may be carried in the RRC signaling.

As one embodiment, the first information may include an RRC information element (RRC IE), or the first information may be carried in the RRC IE.

As one embodiment, the first information includes a RACH generic configuration (RACH-ConfigGeneric), or the first information may be carried in the RACH-ConfigGeneric. The RACH-ConfigGeneric is configured to configure parameters of RACH: in some implementations, including, one or more of the following sub-items: preambleInitialReceivedTargetPower; an initial received power of a random access sequence; powerRampingStep configured to gradually increase the transmission power before transmission of random access; maximum transmission times of the random access sequence (preambleTransMax); random access response window size (raResponseWindowSize), which is configured for indicating a length of a random access response window, that is, the quantity of random access response slots; a timer for MAC contention resolution (macContentionResolutionTimer) for indicating the quantity of slots waiting for MAC contention resolution; maximum times of HARQ retransmissions (maxHARQMsg3Tx), configured to retransmit a RRC connection request message; a size of the RRC connection request window (rarWindowSize), indicating the quantity of RRC connection request slots; information for configuring random access sequences (preambleInfo), including a sequence number, Zadoff-Chu sequence index, Zadoff-Chu sequence root index, and so on. For the related illustration of the RACH-ConfigGeneric, reference may be made to the section 6.3.2 of 3GPP TS 38.331.

As one embodiment, the first information includes message 1-frequency division multiplexing (msg1-FDM), or the first information may be carried in the msg1-FDM. The msg1-FDM is configured to indicate PRACH occasions in the frequency domain at a same time. For the related description of the msg1-FDM, reference may be made to section 6.3.2 of 3GPP TS38.331.

In the embodiment of the present disclosure, the relationship between the first random access occasion group and the time instance is not limited. In some implementations, all random access occasions in the first random access occasion group may be within a time period (i.e., the time instance described above). In other implementations, any two random access occasions in the first random access occasion group are respectively in two different time instances. For example, each random access occasion in the first random access occasion group is at a different time instance. It shall be understood that, in the embodiment of the present disclosure, some two random access occasions in the first random access occasion group are respectively in two different time instances, and correspondingly, other random access occasions in the first random access occasion group except the two random access occasions can be in the same time instance, where the other random access occasions can include one or more random access occasions.

In the embodiment of the present disclosure, the two random access occasions (any two random access occasions, or some two random access occasions) in two different time instances can be replaced by two random access occasions (any two random access occasions, or some two random access occasions) respectively occupying two different time instances.

In addition, in the embodiment of the present disclosure, the above two random access occasions (any two random access occasions, or some two random access occasions) are not specifically limited. As one embodiment, the two random access occasions are frequency division multiplexed. As one embodiment, the two random access occasions are orthogonal in the time domain.

In some scenarios, the first random access occasion group may belong to one of a plurality of random access occasion groups, where one or more of the plurality of random access occasion groups may include a plurality of random access occasions. The plurality of random access occasion groups in embodiments of the present disclosure are described below.

As one embodiment, the plurality of random access occasions of at least two random access occasion groups of the plurality of random access occasion groups may include one or more different random access occasions. That is, the plurality of random access occasions included in each of the at least two random access occasion groups and the plurality of random access occasions included in another of the at least two random access occasion groups include at least one different random access occasion.

It is to be noted that the plurality of random access occasions included in each of the at least two random access occasion groups and the plurality of random access occasions included in another of the at least two random access occasion groups include at least one different random access occasion, which can be understood as all random access occasions included in each of the at least two random access occasion groups and the plurality of random access occasions included in another of the at least two random access occasion groups are different with each other (the following is described with FIG. 3 as an example). It shall be understood that, in the embodiment of the present disclosure, it could also be understood that some of the plurality of random access occasions included in each of the at least two random access occasion groups are different from that of the plurality of random access occasions included in another of the at least two random access occasion groups (described below with FIG. 4 as an example).

In addition, in the embodiment of the present disclosure, random access occasion groups including different random access occasions are not limited. As one embodiment, the plurality of random access occasions included in each of any two random access occasion groups of the plurality of random access occasion groups and the plurality of random access occasions included in another of the any two random access occasion groups include at least one different random access occasion. As one embodiment, the plurality of random access occasions included in each of some two random access occasion groups of the plurality of random access occasion groups and the plurality of random access occasions included in another of the some two random access occasion groups include at least one different random access occasion.

It shall be understood that, in embodiments of the present disclosure, the plurality of random access occasions included in each of all the plurality of random access occasion groups may be identical with the plurality of random access occasions included in another of all the plurality of random access occasion groups.

As an embodiment, the quantity of the plurality of random access occasions included in any of the plurality of random access occasion groups is one of 2, 4, and 8. Alternatively, the quantity of the plurality of random access occasions included in one of the plurality of random access occasion groups is one of 2, 4, and 8. It shall be understood that, in embodiments of the present disclosure, one or more of the plurality of random access occasion groups may also include other numbers of random access occasions.

As another embodiment, the plurality of random access occasion groups correspond, respectively, to the plurality of preambles, and at least two random access occasion groups in the plurality of random access occasion groups correspond to different preambles.

Figure 4:
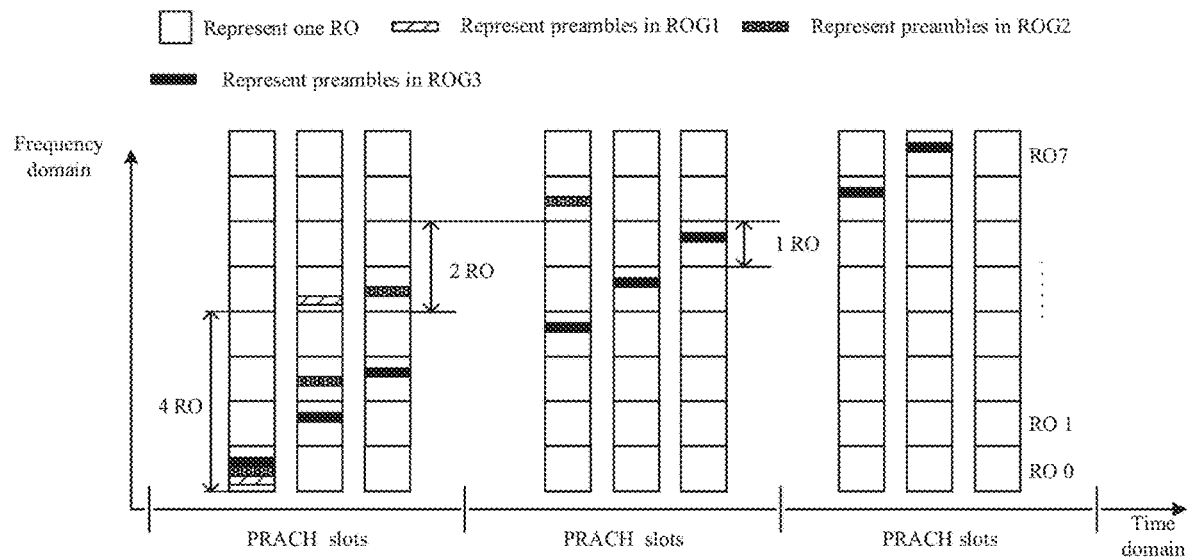
FIG. 4 is a schematic diagram of a relationship between random access occasions and preambles according to other embodiments of the present disclosure.

It is to be noted that the preambles corresponding to the at least two random access occasion groups mentioned above are different, which can be understood as that the preambles corresponding to the plurality of random access occasion groups are different with each other (the following is described with FIG. 4 as an example). It shall be understood that, in the embodiment of the present disclosure, some of random access occasion groups included in the at least two random access occasion groups correspond to different preambles.

As one embodiment, a plurality of first type sequences are configured to generate the plurality of preambles corresponding to the plurality of random access occasion groups, respectively.

Embodiments of the present disclosure are not limited to the plurality of first type sequences. As one embodiment, any two of the plurality of first type sequences are different. As one embodiment, any two of the plurality of first type sequences have different initial values. As one embodiment, any two of the plurality of first type sequences have different cyclic shifts. It shall be understood that in embodiments of the present disclosure, any two of the plurality of first type sequences have different initial values and different cyclic shifts. Alternatively, any two first type sequences of the plurality of first type sequences have same initial values but have different cyclic shifts. Alternatively, any two first type sequences of the plurality of first type sequences have different initial values but have same cyclic shifts.

As one embodiment, some two first type sequences of the plurality of first type sequences are different. As one embodiment, some two first type sequences of the plurality of first type sequences have different initial values. As one embodiment, some two of the plurality of first type sequences have different cyclic shifts. It shall be understood that in embodiments of the present disclosure, some two of the plurality of first type sequences have different initial values and different cyclic shifts. Alternatively, some two first type sequences of the plurality of first type sequences have same initial values but have different cyclic shifts. Alternatively, some two first type sequences of the plurality of first type sequences have different initial values but have same cyclic shifts.

The plurality of random access occasion groups in the embodiments of the present disclosure are described above, and the following describes the manner in which the first random access occasion group in the embodiments of the present disclosure.

As one embodiment, the first random access occasion group may be determined based on an index of a first synchronization signal block and a reception quality of the first synchronization signal block. That is, the method further includes receiving the first synchronization signal block, where an index of the first synchronization signal block and the reception quality of the first synchronization signal block are configured to determine the first random access occasion group.

In the embodiment of the present disclosure, there is no restriction on the determination of the first random access occasion group. As one embodiment, the index of the first synchronization signal block is configured to determine the first random access occasion group. As one embodiment, the reception quality of the first synchronization signal block is configured to determine the first random access occasion group.

In embodiments of the present disclosure, there is no restriction on the reception quality of the first synchronization signal block. As one embodiment, the reception quality of the first synchronization signal block includes reference signal received power (RSRP). As one embodiment, the reception quality of the first synchronization signal block includes synchronization signal RSRP (SS-RSRP). As one embodiment, the reception quality of the first synchronization signal block includes channel state information RSRP (CSI-RSRP). As one embodiment, the reception quality of the first synchronization signal block includes reference signal received quality (RSRQ). As one embodiment, the reception quality of the first synchronization signal block includes signal to interference plus noise ratio (SINR).

As one embodiment, for definition of the SS-RSRP, reference may be made to section 5.1.1 of 3GPP TS 38.215.

As one embodiment, for definition of the CSI-RSRP, reference may be made to section 5.1.2 of 3GPP TS 38.215.

In the embodiments of the present disclosure, the first synchronization signal block can be sent by a network device. The second node being a network device is taken as an example for illuratration, the first synchronization signal block can be sent by the second node. In addition, in embodiments of the present disclosure, the first synchronization signal block may also be referred to as a synchronization signal/physical broadcast channel block (SS/PBCH block).

Additionally, in embodiments of the present disclosure, the index of the first synchronization signal block may be one of a plurality of candidate synchronization signal block indexes. As one embodiment, a respective index of the plurality of candidate synchronization signal block indexes may be mapped to a respective one of the plurality of random access occasion groups, respectively.

As one embodiment, a plurality of beams are respectively applied for transmitting the plurality of preambles in the first random access occasion group, and the plurality of beams are identical. It shall be understood that, in embodiments of the present disclosure, the plurality of beams may be partially or completely identical.

It is to be noted that the beam mentioned in the present disclosure may include or be replaced by at least one of the following: a beam, a physical beam, a logical beam, a spatial filter, a spatial domain filter, a spatial domain transmission filter, a spatial domain reception filter, and an antenna port.

For case of understanding, the frequency hopping scheme of the embodiments of the present disclosure is described below with reference to FIGS. 3 and 4. It is to be noted that in the schemes shown in FIGS. 3 and 4, the quantity of PRACH transmissions in the ROG is described as an example of the quantity of ROs included in the ROG.

FIG. 3 shows a frequency hopping scheme in ROG1 to ROG3 according to an embodiment of the present disclosure. As shown in FIG. 3, the quantity of PRACH transmissions in each of different ROGs is different, where the quantity of PRACH transmissions in ROG1 is 2, the quantity of PRACH transmissions in ROG2 is 4, and the quantity of PRACH transmissions in ROG3 is 8. Moreover, the ROs occupied by different ROGs are relatively independent, so that an initial RB of the RO of each of different ROGs is different. An RB index pattern adopted by ROG1 in the frequency domain is {0, 4}, an RB index pattern adopted by ROG2 in the frequency domain is {0, 2, 4, 6}, and an RB index pattern adopted by ROG3 in the frequency domain is {4, 5, 6, 7, 0, 1, 2, 3}.

For each ROG, a first frequency hopping distance (denoted by "Drog") between two consecutive ROs in the time domain is related to the quantity of PRACH transmissions in the ROG. For ROG1, the number Rep1 of PRACH transmissions in the ROG1 is 2, that is, Rep1=2, the first frequency hopping distance Drog1 can be determined by formula: Drog1=(8/Rep1) RB=4RB. The number Rep2 of PRACH transmissions in the ROG2 is 4, that is, Rep2=4, the first frequency hopping distance Drog2 can be determined by formula: Drog2=(8/Rep2) RB=2RB. The number Rep3 of PRACH transmissions in the ROG3 is 8, that is, Rep3=8, the first frequency hopping distance Drog3 can be determined by formula: Drog3=(8/Rep3) RB=1RB. That is, in the frequency hopping scheme shown in FIG. 3, the first frequency hopping distance in the ROG is inversely proportional to the quantity of PRACH transmissions in the ROG.

FIG. 4 shows a frequency hopping scheme in ROG1 to ROG3 according to another embodiment of the present disclosure. Referring to FIG. 4, different ROGs include different numbers of PRACH transmissions. The quantity of PRACH transmissions in ROG1 is 2, the quantity of PRACH transmissions in ROG2 is 4, and the quantity of PRACH transmissions in ROG3 is 8. In addition, ROs in the plurality of ROGs may overlap in the time domain. The preambles adopted by different ROGs are relatively independent, that is, ROGs can be distinguished by different preambles, so that an initial RB of the RO of each of the different ROGs can be the same. For the ROG1, an RB index pattern used in the frequency domain is {0, 4}. For the ROG2, an RB index pattern used in the frequency domain is {0, 2, 4, 6}. For the ROG3, an RB index pattern used in the frequency domain is {0, 1, 2, 3, 4, 5, 6, 7}.

For each ROG, a first frequency hopping distance (denoted by "Drog") between two consecutive ROs in the time domain is related to the quantity of PRACH transmissions in the ROG. For ROG1, the number Rep1 of PRACH transmissions in the ROG1 is 2, that is, Rep1=2, the first frequency hopping distance Drog1 can be determined by formula: Drog1=(8/Rep1) RB=4RB. The number Rep2 of PRACH transmissions in the ROG2 is 4, that is, Rep2=4, the first frequency hopping distance Drog2 can be determined by formula: Drog2=(8/Rep2) RB=2RB. For ROG3, the number Rep3 of PRACH transmissions in the ROG3 is 8, that is, Rep3=8, the first frequency hopping distance Drog3 can be determined by formula: Drog3=(8/Rep3) RB=1RB. That is, in the frequency hopping scheme shown in FIG. 4, the first frequency hopping distance in the ROG is inversely proportional to the quantity of PRACH transmissions in the ROG.

As mentioned earlier, in the conventional frequency hopping scheme, a frequency hopping distance between two ROs in the ROG is fixed, and an RB occupied by each of different ROs is also fixed, which leads to the limited frequency domain span of ROG and limits the frequency domain diversity gain brought by frequency hopping scheme. In the embodiment of the present disclosure, a new frequency hopping scheme is introduced. The frequency hopping distance (for example, the first frequency hopping distance) between two ROs in the ROG in the embodiments of the disclosure can be changed with the quantity of PRACH transmissions in the ROG, which may be helpful to improving the frequency domain span corresponding to the ROG and improving the frequency domain diversity gain brought by the frequency hopping scheme.

For example, as shown in FIG. 3 or FIG. 4, a frequency domain span of ROG1 including two PRACH transmissions may be a frequency domain range corresponding to four RBs. For another example, as shown in FIG. 3 or FIG. 4, a frequency domain span of ROG2 including four PRACH transmissions may be a frequency domain range corresponding to seven RBs. For another example, as shown in FIG. 3 or FIG. 4, a frequency domain span of ROG3 including eight PRACH transmissions may be a frequency domain range corresponding to eight RBs.

In addition, in the frequency hopping scheme of the embodiment of the present disclosure, frequency hopping distances corresponding to different ROGs are quite different (for example, frequency hopping patterns corresponding to different ROGs are quite different), which is helpful to separate (not overlap) some or all ROs in different ROGs, so as to reduce the collision probability of preambles transmitted on a plurality of different ROs. Especially, when different users choose preambles randomly, even though preambles selected by different users may collide on a certain RO, the probability of collision on multiple different ROs is small. Therefore, the frequency hopping scheme of the embodiment of the disclosure is helpful to improving the coverage performance of the plurality of PRACH transmissions, and reducing the PRACH collision probability, thereby reducing the random access delay and improving the resource utilization efficiency.

The method embodiments of the present disclosure are described in detail above with reference to FIGS. 1 to 4 and the apparatus/device embodiments of the present disclosure are described in detail below with reference to FIGS. 5 to 8. It shall be understood that the description of the method embodiment and the description of the apparatus/device embodiment correspond to each other and therefore, portions not described in detail may be referred to the preceding method embodiment.

Figure 5:
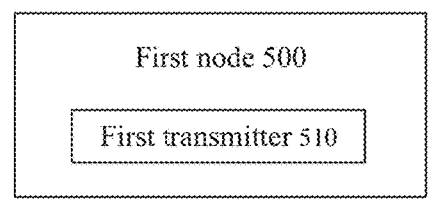
FIG. 5 is a schematic diagram of a first node for wireless communication according to embodiments of the present disclosure.

FIG. 5 is a schematic diagram of a first node used for wireless communication according to an embodiment of the present disclosure. A first node 500 shown in FIG. 5 may include a first transmitter 510.

The first transmitter 510 is configured to send a plurality of preambles in a first random access occasion group, where the first random access occasion group includes a plurality of random access occasions. Two random access occasions in the first random access occasion group that are consecutive in the time domain are separated by a first frequency hopping distance in the frequency domain, and the first frequency hopping distance is related to the quantity of a plurality of random access occasions included in the first random access occasion group.

As one embodiment, the first frequency hopping distance is negatively correlated with the quantity of a plurality of random access occasions included in the first random access occasion group.

As one embodiment, the first node 500 shown in FIG. 5 may include a first receiver. The first receiver is configured to receive first information, and the first information is configured to indicate the quantity of a plurality of random access occasions within a time instance, the plurality of random access occasions within the time instance being frequency division multiplexed. The first frequency hopping distance is related to the quantity of the plurality of random access occasions within the time instance.

As one embodiment, a product of the first frequency hopping distance and the quantity of random access occasions included in the first random access occasion group is not greater than the quantity of random access occasions within a time instance.

As one embodiment, any two random access occasions in the first random access occasion group are respectively within two different time instances.

As one embodiment, the first random access occasion group is one of a plurality of random access occasion groups, and any of the plurality of random access occasion groups includes a plurality of random access occasions. The plurality of random access occasions included in each of at least two random access occasion groups of the plurality of random access occasion groups and the plurality of random access occasions included in another of the at least two random access occasion groups include at least one different random access occasion.

As an embodiment, the first random access occasion group is one of a plurality of random access occasion groups, any of the plurality of random access occasion groups includes a plurality of random access occasions, and the plurality of random access occasion groups correspond, respectively, to a plurality of preambles. At least two random access occasion groups in the plurality of random access occasion groups correspond to different preambles.

As one embodiment, the first receiver is configured to receive a first synchronous signal block, an index of the first synchronous signal block being one of a plurality of candidate synchronous signal block indexes, the index of the first synchronous signal block and a reception quality of the first synchronous signal block being configured to determine the first random access occasion group.

As one embodiment, a plurality of beams are respectively applied for transmitting the plurality of preambles within the first random access occasion group, the plurality of beams being identical.

As one embodiment, the quantity of a plurality of random access occasions included in the first random access occasion group is one of 2, 4, or 8.

Figure 6:
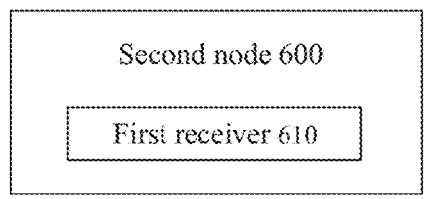
FIG. 6 is a schematic diagram of a second node for wireless communication according to embodiments of the present disclosure.

FIG. 6 is a schematic diagram of a second node used for wireless communication according to an embodiment of the present disclosure. The second node shown in FIG. 6 includes a first receiver 610.

The first receiver 610 is configured to receive one or more of a plurality of preambles within a first random access occasion group, the first random access occasion group including a plurality of random access occasions. Two random access occasions in the first random access occasion group that are consecutive in the time domain are separated by a first frequency hopping distance in the frequency domain, and the first frequency hopping distance is related to the quantity of a plurality of random access occasions included in the first random access occasion group.

As one embodiment, the first frequency hopping distance is negatively correlated with the quantity of a plurality of random access occasions included in the first random access occasion group.

As one embodiment, a plurality of random access occasions are included within a time instance, the plurality of random access occasions within the time instance are frequency division multiplexed, and the first frequency hopping distance is related to the quantity of the plurality of random access occasions within the time instance.

As one embodiment, a product of the first frequency hopping distance and the quantity of random access occasions included in the first random access occasion group is not greater than the quantity of random access occasions within the time instance.

As one embodiment, any two random access occasions in the first random access occasion group are respectively within two different time instances.

As one embodiment, the first random access occasion group is one of the plurality of random access occasion groups, and any of the plurality of random access occasion groups includes a plurality of random access occasions. The plurality of random access occasions included in each of at least two random access occasion groups of the plurality of random access occasion groups and the plurality of random access occasions included in another of the at least two random access occasion groups include at least one different random access occasion.

As an embodiment, the first random access occasion group is one of a plurality of random access occasion groups, any of the plurality of random access occasion groups includes a plurality of random access occasions, and the plurality of random access occasion groups correspond, respectively, to a plurality of preambles. At least two random access occasion groups in the plurality of random access occasion groups correspond to different preambles.

As one embodiment, the first random access occasion group is determined based on an index of a first synchronization signal block and a reception quality of the first synchronization signal block, where the index of the first synchronization signal block is one of a plurality of candidate synchronization signal block indexes.

As one embodiment, a plurality of beams are respectively applied for transmitting the plurality of preambles within the first random access occasion group, the plurality of beams being identical.

As one embodiment, the quantity of a plurality of random access occasions included in the first random access occasion group is one of 2, 4, or 8.

Figure 7:
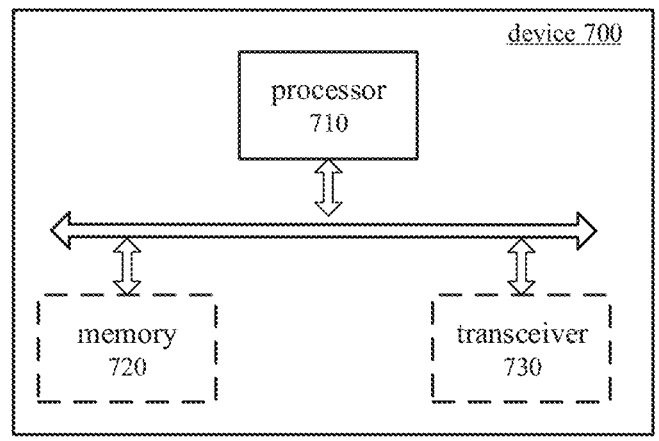
FIG. 7 is a schematic structural diagram of a communication device according to embodiments of the present disclosure.

In an alternative embodiment, the first transmitter 510 may be a transceiver 730. As shown in FIG. 7, the first node 500 may further include a transceiver 730 and a memory 720.

In an alternative embodiment, the first receiver 610 may be a transceiver 730. As illustrated in particular in FIG. 7, the second node 600 may further include a transceiver 730 and a memory 720.

FIG. 7 is a schematic structural diagram of a communication device according to embodiments of the present disclosure. The dotted line in FIG. 7 indicates that the unit or module indicated by the dotted line is optional. The device 700 may be configured to implement the methods described in the above method embodiments. The device 700 may be a chip, a UE, or a network device.

The device 700 may include one or more processors 710. The processor 710 may support the device 700 to implement the methods described previously in the method embodiments. The processor 710 may be a general-purpose processor or a special purpose processor. For example, the processor may be a central processing unit (CPU). Alternatively, the processor may also be other general-purpose processors, digital signal processors (DSP), application specific integrated circuits (ASIC), field programmable gate arrays (FPGA), or other programmable logic devices, discrete gate, or transistor logic devices, discrete hardware components, and the like. The general-purpose processor may be a microprocessor, or the processor may be any conventional processor or the like.

The device 700 may further include one or more memories 720. The memory 720 stores a program that can be executed by the processor 710, such that the processor 710 performs the methods described previously in the method embodiments. The memory 720 may be independent of the processor 710 or may be integrated into the processor 710.

The device 700 may further include a transceiver 730. The processor 710 may communicate with other devices or chips through the transceiver 730. For example, the processor 710 may transmit and receive data with other devices or chips through the transceiver 730.

Figure 8:
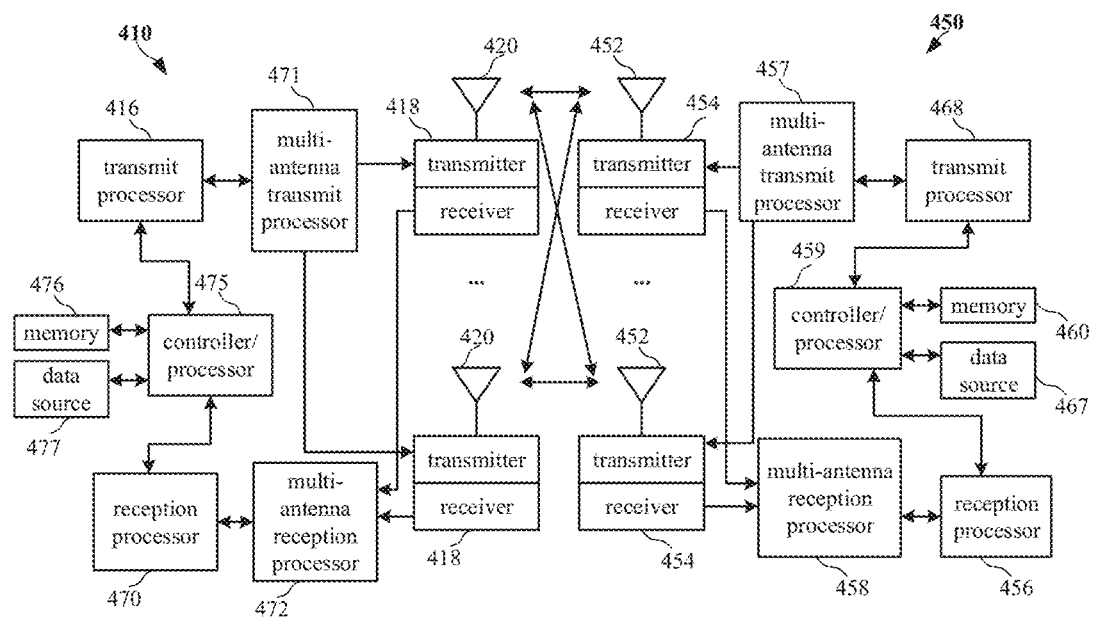
FIG. 8 is a schematic diagram of a hardware module of a communication device according to embodiments of the present disclosure.

FIG. 8 is a schematic diagram of a hardware module of a communication device according to an embodiment of the present disclosure. Specifically, FIG. 8 illustrates a block diagram of a first communication device 450 and a second communication device 410 communicating with each other in an access network.

The first communication device 450 includes a controller/processor 459, a memory 460, a data source 467, a transmit processor 468, a reception processor 456, a multi-antenna transmit processor 457, a multi-antenna reception processor 458, a transmitter/receiver 454, and an antenna 452.

The second communication device 410 includes a controller/processor 475, a memory 476, a data source 477, a reception processor 470, a transmit processor 416, a multi-antenna reception processor 472, a multi-antenna transmit processor 471, a transmitter/receiver 418, and an antenna 420.

In the transmission from the second communication device 410 to the first communication device 450, at the second communication device 410, upper layer data packets from the core network or upper layer data packets from the data source 477 are provided to the controller/processor 475. The core network and the data source 477 represent all protocol layers above the L2 layer. The controller/processor 475 implements the functionality of the L2 layer. In transmissions from the second communication device 410 to the first communication device 450, the controller/processor 475 is configured to provide header compression, encryption, packet segmentation and reordering, multiplexing between logic and transport channels, and radio resource allocation to the first communication device 450 based on various priority metrics. The controller/processor 475 is also responsible for retransmission of lost packets and signaling to the first communication device 450. The transmit processor 416 and the multi-antenna transmit processor 471 implement various signal processing functions for the L1 layer (i.e., the physical layer). The transmit processor 416 implements encoding and interleaving to facilitate forward error correction at the second communication device 410, as well as mapping of signal clusters based on various modulation schemes (e.g., binary phase shift keying, quadrature phase shift keying, multiple phase shift keying, multiple quadrature amplitude modulation). The multi-antenna transmit processor 471 performs digital spatial pre-coding, including codebook-based and non-codebook-based pre-coding, and beamforming processing on the encoded and modulated symbols to generate one or more spatial streams. The transmit processor 416 then maps each spatial stream to sub-carriers, multiplexes the modulated symbols with reference signals (e.g., pilots) in the time domain and/or frequency domain, and then performs inverse fast Fourier transform to generate a physical channel carrying time domain multi-carrier symbol streams. The multi-antenna transmit processor 471 then performs a transmit analog pre-coding/beamforming operation on the time domain multi-carrier symbol streams. Each transmitter 418 converts a baseband multicarrier symbol stream provided by the multi-antenna transmit processor 471 into a radio frequency stream to be provided to different antennas 420.

In the transmission from the second communication device 410 to the first communication device 450, at the first communication device 450, each receiver 454 receives signals through a respective antenna 452. Each receiver 454 recovers information modulated onto the RF carrier and converts the RF stream into a baseband multi-carrier symbol stream for provision to a reception processor 456. The reception processor 456 and the multi-antenna reception processor 458 implement various signal processing functions of the L1 layer. The multi-antenna reception processor 458 performs a received analog pre-coding/beamforming operation on a baseband multi-carrier symbol stream from the receiver 454. The reception processor 456 performs fast Fourier transform (FFT) to convert the baseband multi-carrier symbol stream subjected to the received analog pre-coding/beamforming operation from the time domain to the frequency domain. In the frequency domain, the data signal and the reference signal of the physical layer are demultiplexed by the reception processor 456, where the reference signal is to be used for channel estimation, and the data signal is recovered from any spatial stream destined for the first communication device 450 after being detected by multiple antennas in the multi-antenna reception processor 458. The symbols on each spatial stream are demodulated and recovered in the reception processor 456 to generate a soft decision. The soft decision is then decoded and deinterleaved by the reception processor 456 to recover upper layer data and control signals transmitted by the second communication device 410 on the physical channel. The upper layer data and control signals are then provided to the controller/processor 459. The controller/processor 459 implements the functions of the L2 layer. The controller/processor 459 may be associated with a memory 460 that stores program code and data. The memory 460 may be referred to as a computer readable medium. In transmissions from the second communication device 410 to the first communication device 450, the controller/processor 459 provides demultiplexing between transmission and logical channels, packet reassembly, decryption, header decompression, and control signal processing to recover upper layer data packets from the second communication device 410. The upper layer packets are then provided to all protocol layers above L2 layer. Various control signals may also be provided to L3 layer for L3 processing.

In the transmission from the first communication device 450 to the second communication device 410, at the first communication device 450, upper layer data packets are provided to the controller/processor 459 from a data source 467. The data source 467 represents all protocol layers above the L2 layer. Similar to the transmission functionality at the second communication device 410 described in the transmission from the second communication device 410 to the first communication device 450, the controller/processor 459 implements header compression, encryption, packet segmentation and reordering, and multiplexing between logic and transmission channels, implementing L2 layer functionality for the user plane and the control plane. The controller/processor 459 is also responsible for retransmission of lost packets and signaling to the second communication device 410. The transmit processor 468 performs modulation mapping, channel coding processing, and the multi-antenna transmit processor 457 performs digital multi-antenna spatial pre-coding, including codebook-based pre-coding and non-codebook-based pre-coding, and beamforming processing. The transmit processor 468 then modulates the generated spatial stream into a multi-carrier/single-carrier symbol stream, the multi-carrier/single-carrier symbol stream is provided to different antennas 452 via the transmitter 454 after subjected to analog pre-coding/beamforming operations in the multi-antenna transmit processor 457. Each transmitter 454 first converts the baseband symbol stream provided by the multi-antenna transmit processor 457 into a radio frequency symbol stream which is then provided to the antenna 452.

In the transmission from the first communication device 450 to the second communication device 410, the function at the second communication device 410 is similar to the reception function at the first communication device 450 described in the transmission from the second communication device 410 to the first communication device 450. Each receiver 418 receives a radio frequency signal through a respective antenna 420, converts the received radio frequency signal into a baseband signal, and provides the baseband signal to a multi-antenna reception processor 472 and the reception processor 470. The reception processor 470 and the multi-antenna reception processor 472 jointly implement the function of the L1 layer. The controller/processor 475 implements functions of the L2 layer. The controller/processor 475 may be associated with the memory 476 that stores program code and data. The memory 476 may be referred to as a computer readable medium. In transmissions from the first communication device 450 to the second communication device 410, the controller/processor 475 provides demultiplexing between transmission and logical channels, packet reassembly, decryption, header decompression, control signal processing to recover upper layer data packets from the first communication device 450. The upper layer data packets from controller/processor 475 may be provided to the core network or all protocol layers above the L2 layer and various control signals may be provided to the core network or L3 layer for L3 processing.

As an embodiment, the first communication device 450 includes at least one processor and at least one memory, the at least one memory including computer program codes. The at least one memory and the computer program codes are configured for use with the at least one processor. The first communication device 450 is at least configured to perform: receiving first information, where the first information includes a plurality of beam signals and a plurality of time domain resource sets, the plurality of beam signals and the plurality of time domain resource sets are in one-to-one correspondence with each other. Each of at least two time domain resource sets in the plurality of time domain resource sets includes a first time domain resource, and at least two beam signals corresponding, respectively, to the at least two time domain resource sets are different. At least one of the at least two beam signals is configured to determine whether the second module is in a first state on the first time domain resource, the first state being one of a plurality of candidate states, the plurality of candidate states including at least two of a shutdown state, transmitting a wireless signal with one or more first class beams, and receiving a wireless signal with one or more first class beams.

As an embodiment, the first communication device 450 includes: a memory storing a computer-readable instruction program which, when executed by at least one processor, generates actions including: transmitting multiple preambles in the first random access occasion group, where the first random access occasion group includes a plurality of random access occasions. Two random access occasions in the first random access occasion group that are consecutive in the time domain are separated by a first frequency hopping distance in the frequency domain, and the first frequency hopping distance is related to the quantity of a plurality of random access occasions included in the first random access occasion group.

As an embodiment, the first communication device 450 corresponds to the first node in the present disclosure. As an embodiment, the second communication device 410 corresponds to the second node in the present disclosure.

There is no restriction on the first communication device. As an embodiment, the first communication device 450 is an NCR. As an embodiment, the first communication device 450 is a wireless repeater. As an embodiment, the first communication device 450 is a relay. As an embodiment, the first communication device 450 is a user device which may act as a relay node. As an embodiment, the first communication device 450 is a V2X-enabled user device which may act as a relay node. As an embodiment, the first communication device 450 is a D2D-enabled user device which may act as a relay node.

There is no restriction on the second communication device in embodiments of the disclosure. As an embodiment, the second communication device 410 is an access network device.

As an embodiment, the antenna 452, the receiver 454, the multi-antenna reception processor 458, the reception processor 456, and the controller/processor 459 are configured to receive a plurality of preambles in embodiments of the disclosure.

As an embodiment, the antenna 420, the transmitter 418, the multi-antenna transmit processor 471, the transmit processor 416, and the controller/processor 475 are configured to send a plurality of preambles in embodiments of the disclosure.

As an embodiment, the antenna 452, the transmitter 454, the multi-antenna transmit processor 457, the transmit processor 468, and the controller/processor 459 are configured to send a plurality of preambles in embodiments of the disclosure.

As an embodiment, the antenna 420, the receiver 418, the multi-antenna reception processor 472, the reception processor 470, and the controller/processor 475 are configured to receive a plurality of preambles in embodiments of the disclosure.

The embodiments of the disclosure further provide a computer-readable storage medium for storing programs. The computer-readable storage medium may be applied to an user device or network device according to an embodiment of the present disclosure, and the programs cause a computer to perform the method performed by the user device or network device in various embodiments of the present disclosure.

The embodiments of the disclosure further provide a computer program product. The computer program product includes programs. The computer program product may be applied to an user device or network device provided by embodiments of the present disclosure, and the programs cause a computer to perform the method performed by the an user device or network device in various embodiments of the present disclosure.

The embodiments of the disclosure further provide a computer program. The computer program may be applied to an user device or network device according to an embodiment of the present disclosure, and the computer program causes a computer to perform the method performed by the user device or network device in various embodiments of the present disclosure.

It shall be understood that the terms "system" and "network" in this disclosure may be used interchangeably. In addition, the terms used herein are used only for explanation of specific embodiments of the present disclosure and are not intended to be limiting. The terms "first", "second", "third", "fourth" and the like in the specification and claims of the present disclosure and the accompanying drawings are used to distinguish different objects and are not used to describe a particular order. Furthermore, the terms "including/comprising" and "having" and any variations thereof are intended to cover non-exclusive inclusion.

In embodiments of the present disclosure, the reference to "indication" may be a direct indication, an indirect indication, or an association. For example, A indicates B, which can mean that A directly indicates B, for example, B can be obtained through A. It is also indicated that A indirectly indicates B, for example, A indicates C, and B can be obtained by C. It is also indicated that there is an association between A and B.

In embodiments of the present disclosure, "B corresponding to A" means that B is associated with A from which B may be determined. It shall also be understood, however, that determining B according to A does not mean determining B only according to A, and B may also be determined according to A and/or other information.

In embodiments of the present disclosure, the term "corresponding" may mean a direct or indirect correspondence relationship between the two, an association relationship between the two, indicating and being indicated between the two, configuring and being configured between the two, and the like.

In embodiments of the present disclosure, "predefining/ predefined" or "pre-configured" may be achieved by pre-storing corresponding codes, tables, or other means that may be used to indicate relevant information in devices (e.g., including UEs and network devices), and the specific implementation of which is not limited herein. For example, "predefining/predefined" or "pre-configured" can refer to what is defined in the protocol.

In embodiments of the present disclosure, the "protocol" may refer to a standard protocol in the communication field, for example, may include an LTE protocol, an NR protocol, and related protocols applied in future communication systems, which are not limited in the present disclosure.

The term "and/or" in the embodiment of the present disclosure is merely an association relationship that describes an associated object, indicating that there may be three relationships, for example, A and/or B, which may indicate that there are three situations: A alone, A and B simultaneously, and B alone. In addition, the character "/" herein generally indicates that the related objects are a kind of "or" relationship.

In various embodiments of the present disclosure, the size of the sequence quantity of the above-mentioned processes does not mean the order of execution, and the execution order of each process should be determined by its function and inherent logic, and should not constitute any limitation on the implementation process of the embodiment of the present disclosure.

In several embodiments provided herein it should be understood that the disclosed systems, devices, and methods may be implemented in other ways. For example, the above-described embodiments of the device is only schematic, for example, the division of the unit is only a logical function division, and in practice, there may be another division mode, for example, multiple units or components may be combined or integrated into another system, or some features may be ignored or not performed. On the other hand, the coupling or direct coupling or communication connection between each other shown or discussed may be indirect coupling or communication connection through some interfaces, devices, or units, and may be electrical, mechanical or other form.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

In the above-described embodiments, it may be implemented in whole or in part by software, hardware, firmware, or any combination thereof. When implemented in software, it can be implemented in whole or in part in the form of a computer program product. The computer program product includes one or more computer instructions. When the computer program instructions are loaded and executed on a computer, the processes or functions described in accordance with embodiments of the present disclosure are generated in whole or in part. The computer may be a general-purpose computer, a special purpose computer, a computer network, or other programmable device. The computer instructions may be stored in the computer-readable storage medium, or transmitted from one computer-readable storage medium to another computer-readable storage medium, for example, the computer instructions may be transmitted from one Web site, computer, server, or data center to another Web site, computer, server, or data center via wired (e.g., coaxial cable, optical fiber, digital subscriber line (DSL)) or wireless (e.g., infrared, wireless, microwave, etc.). The computer-readable storage medium may be any usable medium that a computer can read or a data storage device such as a server, data center, or the like that includes one or more usable media integration. The usable media may be magnetic media (e.g., floppy disk, hard disk, magnetic tape), optical media (e.g., digital video disc (DVD)), or semiconductor media (e.g., solid state disk (SSD)), etc.

The above-mentioned is only the specific implementation of the present disclosure, but the scope of protection of the present disclosure is not limited thereto. Any technical person familiar with the technical field who can easily think of changes or substitutions within the technical scope disclosed in the present disclosure should be covered within the scope of protection of the present disclosure. Therefore, the scope of protection of this application shall be subject to the scope of protection of the claims.

What is claimed is:

1. A method for wireless communication, comprising:
   transmitting a plurality of preambles in a first random access occasion group, the first random access occasion group comprising a plurality of random access occasions;
   wherein two random access occasions in the first random access occasion group are consecutive in time domain and separated by a first frequency hopping distance in frequency domain, and the first frequency hopping distance is related to a quantity of the plurality of random access occasions comprised in the first random access occasion group, and wherein the first frequency hopping distance is negatively correlated with the quantity of the plurality of random access occasions comprised in the first random access occasion group.

2. The method of claim 1, wherein the method further comprises:
receiving first information, wherein the first information indicates a quantity of a plurality of random access occasions within a time instance, the plurality of random access occasions within the time instance being frequency division multiplexed;
wherein the first frequency hopping distance is related to the quantity of the plurality of random access occasions within the time instance.

3. The method of claim 1, wherein a product of the first frequency hopping distance and the quantity of the plurality of random access occasions comprised in the first random access occasion group is not greater than a quantity of a plurality of random access occasions within a time instance.

4. The method of claim 1, wherein each random access occasion in the first random access occasion group is in a different time instance.

5. The method of claim 1, wherein the first random access occasion group is one of a plurality of random access occasion groups, and each of the plurality of random access occasion groups comprises a plurality of random access occasions; and
wherein for at least two random access occasion groups of the plurality of random access occasion groups, the plurality of random access occasions comprised in each of the at least two random access occasion groups and the plurality of random access occasions comprised in another of the at least two random access occasion groups comprise at least one different random access occasion.

6. The method of claim 1, wherein the first random access occasion group is one of a plurality of random access occasion groups, each of the plurality of random access occasion groups comprises a plurality of random access occasions, and the plurality of random access occasion groups correspond, respectively, to a plurality of preambles; and
wherein at least two random access occasion groups in the plurality of random access occasion groups correspond to different preambles.

7. The method of claim 1, wherein the method further comprises:
receiving a first synchronous signal block, wherein an index of the first synchronous signal block being one of a plurality of candidate synchronous signal block indexes, and the index of the first synchronous signal block and a reception quality of the first synchronous signal block are configured to determine the first random access occasion group.

8. The method of claim 1, wherein a plurality of beams are respectively applied for transmitting the plurality of preambles in the first random access occasion group, the plurality of beams being the same.

9. The method of claim 1, wherein the quantity of the plurality of random access occasions comprised in the first random access occasion group is one of 2, 4, and 8.

10. A method for wireless communication, comprising:
receiving one or more of a plurality of preambles in a first random access occasion group, the first random access occasion group comprising a plurality of random access occasions;
wherein two random access occasions in the first random access occasion group are consecutive in time domain and separated by a first frequency hopping distance in frequency domain, and the first frequency hopping distance is related to a quantity of the plurality of random access occasions comprised in the first random access occasion group, wherein the first frequency hopping distance is negatively correlated with the quantity of the plurality of random access occasions comprised in the first random access occasion group.

11. The method of claim 10, wherein there are a plurality of random access occasions within a time instance, the plurality of random access occasions within the time instance being frequency division multiplexed, and the first frequency hopping distance being related to the quantity of the plurality of random access occasions within the time instance.

12. The method of claim 10, wherein a product of the first frequency hopping distance and the quantity of the plurality of random access occasions comprised in the first random access occasion group is not greater than a quantity of a plurality of random access occasions within a time instance.

13. The method of claim 10, wherein each random access occasion in the first random access occasion group is in a different time instance.

14. The method of claim 10, wherein the first random access occasion group is one of a plurality of random access occasion groups, and each of the plurality of random access occasion groups comprises a plurality of random access occasions; and
wherein for at least two random access occasion groups of the plurality of random access occasion groups, the plurality of random access occasions comprised in each of the at least two random access occasion groups and the plurality of random access occasions comprised in another of the at least two random access occasion groups comprise at least one different random access occasion.

15. A first node for wireless communication, comprising:
at least one processor; and
one or more memories coupled to the at least one processor and storing programming instructions for execution by the at least one processor to cause the first node to:
transmit a plurality of preambles in a first random access occasion group, the first random access occasion group comprising a plurality of random access occasions;
wherein two random access occasions in the first random access occasion group are consecutive in time domain and separated by a first frequency hopping distance in frequency domain, and the first frequency hopping distance is related to a quantity of the plurality of random access occasions comprised in the first random access occasion group, wherein the first frequency hopping distance is negatively correlated with the quantity of the plurality of random access occasions comprised in the first random access occasion group.

16. The first node of claim 15, wherein the programming instructions, when executed by the at least one processor, cause the first node to:
receive first information, wherein the first information indicates a quantity of a plurality of random access occasions within a time instance, the plurality of random access occasions within the time instance being frequency division multiplexed;
wherein the first frequency hopping distance is related to the quantity of the plurality of random access occasions within the time instance.

17. The first node of claim 15, wherein a product of the first frequency hopping distance and the quantity of the plurality of random access occasions comprised in the first random access occasion group is not greater than the quantity of a plurality of random access occasions within a time instance.

18. The first node of claim 15, wherein each random access occasion in the first random access occasion group is in a different time instance.

19. The first node of claim 15, wherein the first random access occasion group is one of a plurality of random access occasion groups, and each of the plurality of random access occasion groups comprises a plurality of random access occasions; and wherein for at least two random access occasion groups of the plurality of random access occasion groups, the plurality of random access occasions comprised in each of the at least two random access occasion groups and the plurality of random access occasions comprised in another of the at least two random access occasion groups comprise at least one different random access occasion.

20. The first node of claim 15, wherein the first random access occasion group is one of a plurality of random access occasion groups, each of the plurality of random access occasion groups comprises a plurality of random access occasions, and the plurality of random access occasion groups correspond, respectively, to a plurality of preambles; and wherein at least two random access occasion groups in the plurality of random access occasion groups correspond to different preambles.

\* \* \* \* \*